Patented Jan. 20, 1931

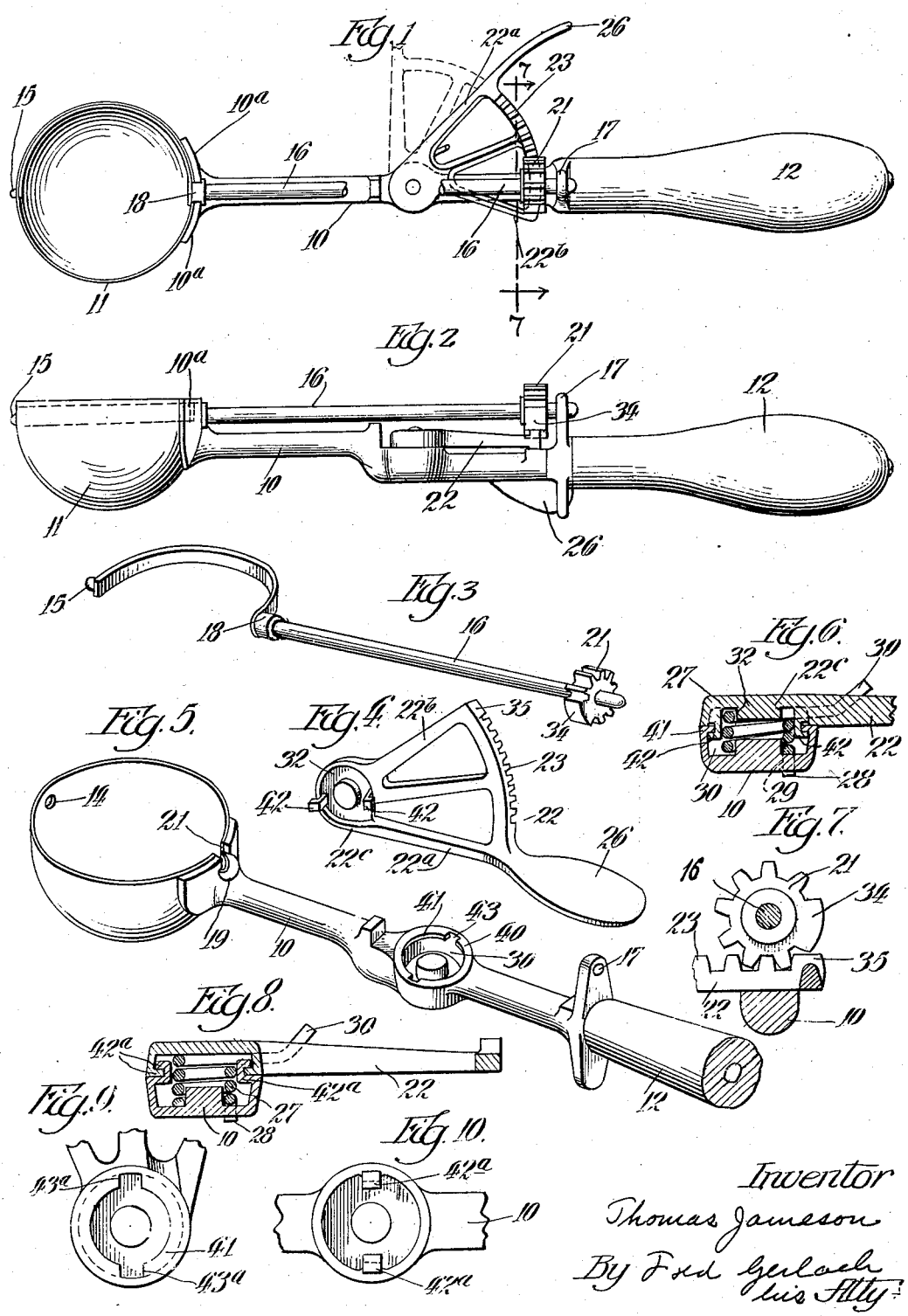
Jan. 20, 1931. T. JAMESON 1,789,588
ICE CREAM DISHER
Filed April 30, 1930

1,789,588

UNITED STATES PATENT OFFICE

THOMAS JAMESON, OF NEWARK, NEW JERSEY, ASSIGNOR TO THE GILCHRIST COMPANY, OF NEWARK, NEW JERSEY, A CORPORATION OF NEW JERSEY

ICE-CREAM DISHER

Application filed April 30, 1930. Serial No. 448,490.

The invention relates to ice cream dishers, and one of its objects is to improve the construction of dishers of the type set forth in Letters Patent No. 1,132,657 dated March 23, 1915.

Another object of the invention is to provide, in a disher in which the scraper and pinion are fixed to a shaft and are removable therewith, simple and improved means for interlocking the finger lever for operating the scraper.

Another object of the invention is to provide an improved disher in which the operating parts may be easily and quickly assembled and taken apart.

Other objects of the invention will appear from the detailed description.

The invention consists in the several novel features hereinafter set forth and more particularly defined by claims at the conclusion hereof.

In the drawings: Fig. 1 is a plan of a disher embodying the invention. Fig. 2 is a side elevation. Fig. 3 is a perspective of the scraper and its shaft. Fig. 4 is a perspective of the finger lever. Fig. 5 is a perspective of the shank or frame to which the bowl and handle are secured. Fig. 6 is a transverse section through the pivotal connection between the lever and the shank. Fig. 7 is a section on line 7—7 of Fig. 1. Fig. 8 is a section showing a modified form of the invention. Fig. 9 is an inverted plan of the lever, and Fig. 10 is a plan of the shank in said modified form.

The invention is exemplified in a disher comprising a shank or frame 10, the outer end of which has a lateral extension 10ª, to which a hemispherical bowl 11 is fixed. A handle 12 is fixedly secured to the inner end of the shank. A semi-circular scraper 13, conforming to the inner periphery of the bowl 11 and formed of a flexible strip of metal, is adapted to sweep around the bowl to sever the ice-cream therefrom. A bearing hole 14 is formed in the bowl to receive a stud or trunnion 15 fixed to the outer end of the scraper. The latter, being formed of a strip of metal, is yieldable sufficiently to permit the stud 15 to be sprung into and out of the bearing hole 14 in assembling the scraper in the bowl and removing it therefrom. The scraper is secured to a shaft 16 which extends longitudinally of and overlies the shank 10. The inner end of the shaft is held in a bearing 17 which is integrally formed with the shank 10. The outer end of the shaft 16 is provided with an enlarged bearing portion 18, to which the inner end of the scraper 13 is secured. A pinion 21 is fixed to shaft 16 adjacent bearing 17. Bearing portion 18 is rotatably held in a bearing 19 which is formed with a restricted slot 20 extending from the top of the bearing to the top of the shank and bowl. This forms an undercut bearing for the shaft 16 adjacent the bowl which permits the shaft to be moved transversely through the slot, when the bearing portion 18 has been moved longitudinally out of bearing 19. When the stud 15 is sprung out of opening 14, the shaft 16 is longitudinally and outwardly slidable in bearings 19 and 17, so that the portion of the shaft 16 inwardly of the enlarged bearing-portion 18 may be lifted or moved transversely through the slot 20, to remove the scraper 13 from the bowl and permit the inner end of the shaft to be withdrawn from bearing 17. The scraper, shaft, and pinion, being fixed together, are removable and replaceable as a unit. A finger lever 22 rotates pinion 20 to operate shaft 16 to rotate the scraper 13 in the bowl. Said lever comprises a hub 22ᶜ, arms 22ª and 22ᵇ at its sides, and a connecting arcuate member having a rack 23 on its upper face adapted to mesh with said pinion. At its distal end, the lever is provided with a thumb-piece 26. A coil spring 27 is confined between the shank and the lever, for retracting the scraper to its normal position at one side of the bowl. This spring has a downturned end 28 which extends through a hole 29 in the shank and an upturned end 30 which is adapted to engage the inner side of arm 22ª of lever 22. The lower portion of spring 20 is enclosed in a recess 31 which is formed in the shank, and the upper coil thereof is enclosed in an annular recess 32 in the bottom face of lever 22. This construction permits the lever, spring, and shank to be assembled and disassembled by relative transverse movement of the lever and shank, and also permit the spring to be wound up or placed under tension by the swinging of the lever 22. Rack 23 has a stop lug 35 adapted to engage the pinion and arrest the lever, shaft, and scraper against movement in the spring-pressed direction when the scraper reaches its normal position at the top and one side of the bowl. The teeth of pinion 21 are interrupted at 34, so the pinion will be assembled with the rack 23, to correctly and normally position the scraper in the bowl. Thumb-piece 26 engages the handle 12 to limit the rotation of the scraper 13 and shaft 16 in the manually operated direction. The stop 34 and the stopping of the lever by thumb-piece 26 limit the stroke of the lever to impart the normal working stroke of the scraper in the bowl. The hub 22°, rack 23 of lever 22, overlie the shank 10, and the rack is guided between pinion 21 and the shank.

The lower face of hub 22° of lever 22 bears on an annular upper face 40 formed on an undercut rib 41 which is integral with the shank. Hooks 42 project downwardly from the lever and fit around rib 41 to hold the lever and shank in connected relation and to form a fulcrum around which the lever may swing. Notches 43 are formed in rib 41 to permit the hooks to pass into the recess 31 in the shank and be rotated into coactive relation with said rib, and to permit the hooks to be withdrawn from the recess. Hooks 42 are diametrically opposite each other to hold the lever in the plane of its movement. These hooks and notches are positioned so as to retain the fulcrum end of the lever in connected relation to the shank during the working stroke of the lever, and to permit their separation when the lever is swung into an abnormal position in the spring-pressed direction. When the scraper 13 and pinion 21 and shaft 16 are removed, the spring will swing the lever transversely to an abnormal position at one side of the shank, as indicated by dotted lines in Fig. 1. In this position hooks 42 on the lever will be in registry with notches 43 in rib 41 on the shank, so the lever will be free to be separated from the shank by withdrawal of the hooks from the shank. When the lever is withdrawn, the spring will be free to be removed from the shank for replacement or other purpose. When the lever is in its abnormal position, as shown by dotted lines in Fig. 1, the spring 27 will be unwound. In assembling the lever and shank, the terminal 30 of spring 27 will engage arm 22ᵃ of lever 22 while the hooks 42 are in registry with notches 43 and the lever is then moved so hooks 42 will pass through said notches. The lever will then be swung into the position shown in full lines, which will wind up the spring and bring the hooks 42 into coacting relation with rib 41, so that, after the shaft has been placed in the bearings on the shank, pinion 21 will limit the movement of lever 22 in the spring-pressed direction, the spring will be kept under tension during the working strokes, and the lever-hub will be held against separation from the shank by said hooks.

In assembling the disher, the spring is placed in the socket 31 in the shank; the hub of lever 22 is then placed over socket 31 in the shank while the lever is in the position shown by dotted lines, which will bring the lever-arm 22 into engagement with spring terminal 30; the lever will be pressed toward the shank to pass hooks 42 through notches 43; then the lever will be swung to its normal position which will wind up the spring and bring the hooks 42 into coactive relation with rib 41 to hold the lever in connected relation with the shank during the working strokes of the lever; then the inner end of the shaft 16 will be inserted into bearing 17 and its outer end swung through slot 20 and shifted longitudinally to interlock bearing portion 18 with bearing 19 in the shank, while the interrupted portion 34 of the pinion is positioned against stop 35 on the lever; and then the trunnion 15 of the scraper will be snapped into bearing 14 in the bowl, whereupon the scraper will be operative by the lever across the bowl to remove the cream therefrom. To take the disher apart, the trunnion 15 will be snapped out of bearing 14 and shaft 16 will be shifted longitudinally to withdraw bearing portion 18 from bearing 19, and then the shaft will be swung through slot 20 and its inner end will be withdrawn from bearing 17. The removal of the pinion, shaft, and scraper, will release lever 22 so it will be swung by the spring 27 to its abnormal position in which hooks 42 will be released, so that the lever may be removed. When the lever is removed, the spring will be accessible for replacement, if desired.

In the modified form of the invention illustrated in Figs. 8, 9, and 10, hooks 42ᵃ are integrally formed with the shank and rib 41ᵃ is integrally formed with the lever, and has notches 43ᵃ for the insertion and removal of the hooks, to removably fulcrum the lever on the shank.

The invention exemplifies an ice-cream disher in which the lever is removably held in operative relation to the shank by enclosed lugs which permit the lever to be assembled in operative relation with the shank by an abnormal pivotal movement of the lever in the spring-pressed direction; also a construction in which such lugs are concealed between the lever and the shank; also a construction in which a plurality of diametrically opposite lugs hold the shank and lever in connected relation.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an ice cream disher, the combination of a bowl, a shank on the bowl, and provided with a handle, a scraper fitting in the bowl, a shaft secured to the scraper and rotatably mounted on the shank, a lever, means between the lever and the shaft for rotating the scraper, and a separable pivotal connection between the lever and the shank comprising interfitting elements on and enclosed between the lever and the shank.

2. In an ice cream disher, the combination of a bowl, a shank on the bowl, and provided with a handle, a scraper fitting in the bowl, a shaft secured to the scraper and rotatably mounted on the shank, a lever provided with a rack, a pinion on the shaft for rotating the scraper, and a separable pivotal connection between the lever and the shank comprising interfitting elements on and enclosed between the lever and the shank.

3. In an ice cream disher, the combination of a bowl, a shank on the bowl, and provided with a handle, a scraper fitting in the bowl, a shaft secured to the scraper and rotatably mounted on the shank, a lever, means between the lever and the shaft for rotating the scraper, a spring, a housing for the spring between the lever and the shank, and a separable pivotal connection between the lever and the shank comprising interfitting elements on the lever and the shank, and within said housing.

4. In an ice-cream disher, the combination of bowl, a shank on the bowl and provided with a handle, a scraper fitting in the bowl, a shaft secured to the scraper and rotatably mounted on the shank, a lever, means between the lever and the shaft for rotating the scraper, and a separable pivotal connection between the lever and the shank comprising a pair of oppositely disposed hook lugs, and means engaged by said lugs.

5. In an ice cream disher, the combination of a bowl, a shank on the bowl and provided with a handle, a scraper fitting in the bowl, a shaft secured to the scraper and rotatably mounted on the shank, a lever, means between the lever and the shaft for rotating the scraper, and a separable pivotal connection between the lever and the shank comprising a pair of oppositely disposed hook lugs, and a notched rib engaged by said lugs and enclosed between the lever and the shank.

6. In an ice cream disher, the combination of a bowl, a shank on the bowl and provided with a handle, and a recess, a scraper fitting in the bowl, a shaft secured to the scraper and rotatably mounted on the shank, a lever having a recess in its hub, means between the lever and the shaft for rotating the scraper, a spring in the recesses, and a separable pivotal connection between the lever and the shank comprising a pair of oppositely disposed hook lugs in said recesses, and means engaged by said lugs.

7. In an ice cream disher, the combination of a bowl, a shank on the bowl and provided with a handle, a scraper fitting in the bowl, a shaft secured to the scraper and rotatably mounted on the shank, a lever, means between the lever and the shaft for rotating the scraper, and a separable pivotal connection betweeen the lever and the shank comprising an enclosed hook and an interfitting element.

8. In an ice cream disher, the combination of a bowl, a shank on the bowl and provided with a handle, and a recess, a scraper fitting in the bowl, a shaft secured to the scraper and rotatably mounted on the shank, a lever provided with a recess, means between the lever and the shaft for rotating the scraper, and a separable pivotal connection between the lever and the shank comprising a hook to extend into one of the recesses and an interfitting element.

9. In an ice cream disher, the combination of a bowl, a shank on the bowl and provided with a handle and a recess, a scraper fitting in the bowl, a shaft secured to the scraper and rotatably mounted on the shank, a lever provided with a recess, means between the lever and the shaft for rotating the scraper, a spring enclosed in said recesses, and a separable pivotal connection between the lever and the shank comprising a hook to extend into one of the recesses and an interfitting element.

10. In an ice cream disher, the combination of a bowl, a shank on the bowl and provided with a handle and a recess, a scraper fitting in the bowl, a shaft secured to the scraper and rotatably mounted on the shank, a lever provided with a recess, means between the lever and the shaft for rotating the scraper, and a separable pivotal connection between the lever and the shank comprising a pair of hooks to extend into one of the recesses and an interfitting element.

11. In an ice cream disher, the combination of a bowl, a shank on the bowl and provided with a handle, a scraper fitting in the bowl, a shaft secured to the scraper and rotatably mounted on the shank, a lever, means between the lever and the shaft for rotating the scraper, the lever and shank being provided with abutting faces and one of them having a recess therein, and a separable pivotal connection between th lever and the shank comprising a hook lug on the other element and extending into said recess.

12. In an ice cream disher, the combination of a bowl, a shank on the bowl and provided with a handle, a scraper fitting in the bowl, a shaft secured to the scraper and rotatably mounted on the shank, a lever, means between the lever and the shaft for rotating the scraper, the lever and shank being provided with abutting faces and one of them having a recess therein, a spring in said recess, and a separable pivotal connection between the lever and the shank comprising a hook lug on the other element and extending into said recess.

13. In an ice cream disher, the combination of a bowl, a shank on the bowl and provided with a handle, a scraper fitting in the bowl, a shaft secured to the scraper and rotatably mounted on the shank, a lever, means between the lever and the shaft for rotating the scraper, the lever and shank being provided with abutting faces, and one of them having a recess therein, and a separable pivotal connection between the lever and the shank comprising a plurality of hook lugs on the other element and extending into said recess.

Signed at Newark, New Jersey, this 14th day of April, 1930.

THOMAS JAMESON.